(12) United States Patent
Chang

(10) Patent No.: US 7,139,574 B2
(45) Date of Patent: Nov. 21, 2006

(54) METHOD OF SUPPORTING REVERSE FCH GATING IN BASE STATION OF A MOBILE COMMUNICATION SYSTEM

(75) Inventor: Yong Chang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 431 days.

(21) Appl. No.: 10/217,962

(22) Filed: Aug. 13, 2002

(65) Prior Publication Data
US 2003/0032431 A1 Feb. 13, 2003

(30) Foreign Application Priority Data
Aug. 13, 2001 (KR) ............... P2001-48835

(51) Int. Cl.
H04Q 7/20 (2006.01)
H04B 7/00 (2006.01)

(52) U.S. Cl. ............... 455/436; 455/439; 455/522; 370/331

(58) Field of Classification Search ........ 455/436–439, 455/522; 370/331, 332, 333, 335, 342, 348, 370/350
See application file for complete search history.

(56) References Cited

U.S. PATENT DOCUMENTS

| 6,385,184 B1 * | 5/2002 | Kitade et al. ............. 370/337 |
| 6,434,367 B1 * | 8/2002 | Kumar et al. .............. 455/70 |
| 6,438,117 B1 * | 8/2002 | Grilli et al. .............. 370/331 |
| 6,526,030 B1 * | 2/2003 | Rezaiifar et al. ......... 370/335 |
| 6,621,809 B1 * | 9/2003 | Lee et al. ................ 370/335 |
| 6,801,512 B1 * | 10/2004 | Cudak et al. ............ 370/332 |
| 6,819,660 B1 * | 11/2004 | Khare et al. ............. 370/342 |
| 2002/0082020 A1 * | 6/2002 | Lee et al. ................ 455/450 |

FOREIGN PATENT DOCUMENTS

JP 10094053 A * 4/1998
WO WO 200074292 A1 * 12/2000

OTHER PUBLICATIONS

3G Mobile Communication Technologies, 2000, "Reverse link gating in cdma2000",(IEE Conf. Publ. No. 471); Mar. 27-29, 2000; pp. 65-69.*
Telecomm R&D Center, Samsung Electron. Co. Ltd., "Air-link performance of the cdma2000 based mobile wireless network", IEEE , vol. 6; Nov. 25-29, 2001; pp. 3405-3428 vol. 6.*
Samsung Etectronics Co., "Gated Transmission of DPCCH in DCH/DCH Control only Substates", TSG-RAN Working Group 1 Meeting #3,□□Apr. 18-20, 1999, pp. 1-6.*

* cited by examiner

Primary Examiner—Lester G. Kincaid
Assistant Examiner—Marisol Figueroa
(74) Attorney, Agent, or Firm—Dilworth & Barrese LLP

(57) ABSTRACT

A method of supporting reverse channel gating in a BS (Base Station) of a mobile communication system. At a handoff from a first BS to a second BS, the first BS transmits to the second BS information about whether an MS (Mobile Station) transmits data on the channel to the first BS in a reverse gating mode. The second BS determines whether to support the reverse gating mode after the handoff. Then the second BS transmits to the first base station a handoff request acknowledgement message including information whether the second BS supports the reverse gating mode after the handoff.

7 Claims, 14 Drawing Sheets

| 7 | 6 | 5 | 4 | 3 | 2 | 1 | 0 | Octet |
|---|---|---|---|---|---|---|---|---|
| colspan="8" | At Element Identifier | | | | | | | 1 |
| colspan="8" | Length | | | | | | | 2 |
| colspan="8" | Physical Channel Count | | | | | | | 3 |
| OTD | colspan="7" | Frame Offset | | | | | | | 4 |
| colspan="4" | Physical Channel Type 1 | | | | Walsh Code Channel Index 1 (high part) | | | | 5 |
| Rev_FCH _Gating 1 | colspan="3" | Pilot Gating Rate 1 | | | | QOF Mask 1 | | | | 6 |
| colspan="8" | Walsh Code Channel Index 1 (low part) | | | | | | | 7 |
| colspan="8" | ARFCN 1 (high part) | | | | | | | 8 |
| Pilot PN Code 1 (high part) | colspan="3" | Reserved | | | Power combined 1 | Freq. Included 1 | colspan="2" | ARFCN 1 (low part) | | | 9 |
| colspan="8" | Pilot PN Code 1 (low part) | | | | | | | ... |
| colspan="4" | Physical Channel Type n | | | | Walsh Code Channel Index n (high part) | | | | k |
| Rev_FCH _Gating n | colspan="3" | Pilot Gating Rate n | | | | QOF Mask n | | | | k+1 |
| colspan="8" | Walsh Code Channel Index n (low part) | | | | | | | k+2 |
| colspan="8" | ARFCN n (high part) | | | | | | | k+3 |
| Pilot PN Code n (high part) | colspan="3" | Reserved | | | Power combined n | Freq. Included n | colspan="2" | ARFCN n (low part) | | | k+4 |
| colspan="8" | Pilot PN code n (low part) | | | | | | | k+5 |

FIG. 3

| 7 | 6 | 5 | 4 | 3 | 2 | 1 | 0 | Octet |
|---|---|---|---|---|---|---|---|---|
| colspan=8 | A3/A7 Element Identifier | | | | | | | 1 |
| colspan=8 | Length | | | | | | | 2 |
| Reserved | Rev_FCH Gating | colspan=6 | Rev_Pwr_Cntl_Delay | | | | | 3 |
| colspan=2 | A3 Traffic Channel Protocol Stack | colspan=3 | Pilot Gating Rate | colspan=3 | (MSB) | | | 4 |
| colspan=8 | ARFCN ... (LSB) | | | | | | | 5 |
| colspan=2 | Reserved | OTD | colspan=5 | Count of Physical Channels | | | | 6 |
| colspan=4 | Physical Channel 2 | colspan=4 | Physical Channel 1 | | | | | 7 |
| colspan=4 | Physical Channel 4 | colspan=4 | Physical Channel 3 | | | | | 8 |

FIG. 4

| 7 | 6 | 5 | 4 | 3 | 2 | 1 | 0 | Octet |
|---|---|---|---|---|---|---|---|---|
| A1 Element Identifier ||||||||  1 |
| Reserved |||| Band Class |||| 2 |
| Number of Preamble Frames ||| Reset L2 | Reset FPC | Encryption Mode || Private LCM | 3 |
| Rev_Pwr_CntL_Delay_Include | Rev_Pwr_CntL_Delay || Nom_Pwr_Ext | Nom_Pwr |||| 4 |
| Reserved | FPC Subchannel Information ||||||| FPC SubChan Info Included | 5 |
| Reserved | Power Control Step ||||||| Power Control Step Included | 6 |

FIG.5

| 7 | 6 | 5 | 4 | 3 | 2 | 1 | 0 | Octet |
|---|---|---|---|---|---|---|---|---|
| A3/A7 Element Identifier ||||||||  1 |
| Length |||||||| 2 |
| Reserved ||| Physical Channel Type |||| New A3 Indicator | 3 |
| Length of Cell Info Record |||||||| 4 |
| Cell Info Record{ |||||||| |
| Cell Identification Discriminator 1 |||||||| i |
| Cell Identification 1 |||||||| Var. |
| Reserved ||| SR3 Incl | QOF_Mask 1 | New Cell Indicator | PWR_Comb_Ind | (MSB) | j |
| Pilot_PN 1 ||||||| (LSB) | j+1 |
| Code_Chan 1 |||||||| j+2 |
| Reserved | Rev_Gating Mode | Rev_Pwr_Cntl_Delay || Lower QOF_Mask 1 || Upper QOF_Mask 1 || j+3 |
| Lower Code_Chan 1 |||||||| j+4 |
| Upper Code_Chan 1 |||||||| j+5 |
| . . . |||||||| . . . |
| Cell Identification Discriminator n |||||||| k |
| Cell Identification n |||||||| Var. |
| Reserved ||| SR3 Incl | QOF_Mask n | New Cell Indicator | PWR_Comb_Ind | (MSB) | l |
| Pilot_PN n ||||||| (LSB) | l+1 |
| Code_Chan n |||||||| l+2 |
| Reserved | Rev_Gating Mode | Rev_Pwr_Cntl_Delay || Lower QOF_Mask n || Upper QOF_Mask n || l+3 |
| Lower Code_Chan n |||||||| l+4 |
| Upper Code_Chan n |||||||| l+5 |
| }Cell Info Record |||||||| |
| Length of Traffic Circuit ID |||||||| j |
| (MSB) | Length of Traffic Circuit ID ||||||| j+1 |
| . . . |||||||| . . . |
| | | | | | | | (LSB) | k |
| Extended Handoff Direction Parameters Field Length |||||||| k+1 |
| Extended Handoff Direction Parameters-1st cell,1st octet |||||||| k+2 |
| . . . |||||||| . . . |
| Extended Handoff Direction Parameters-1st cell,last octet |||||||| m |
| . . . |||||||| . . . |
| Continued on Fig.6b |||||||| |

FIG. 6a

| | |
|---|---|
| Continued from Fig.6a | |
| ... | ... |
| Extended Handoff Direction Parameters-last cell,1st octet | n |
| ... | ... |
| Extended Handoff Direction Parameters-last cell,last octet | o |
| Length of Channel Element ID | o+1 |
| (MSB) Channel Element ID – first octet | o+2 |
| ... | ... |
| Channel Element ID – last octet (LSB) | p |
| Length of A3 Originating ID 1 | p+1 |
| (MSB) | p+2 |
| A3 Originating ID 1 | ... |
| (LSB) | q |
| ... | ... |
| Length of A3 Originating ID n | r |
| (MSB) | r+1 |
| A3 Originating ID n | ... |
| (LSB) | s |
| Length of A7 Destination ID | s+1 |
| (MSB) | s+2 |
| A7 Destination ID | ... |
| (LSB) | t |

FIG.6b

| 7 | 6 | 5 | 4 | 3 | 2 | 1 | 0 | Octet |
|---|---|---|---|---|---|---|---|---|
| colspan="8" | Element Identifier | | | | | | | | 1 |
| colspan="8" | Length | | | | | | | | 2 |
| FPC_PRL_CHAN | Reserved | Rev_FCH_Gating_Mode | colspan="5" | Rev_Pwr_Cntl_Delay | Count of Subchan Gains | | | | 3 |
| colspan="5" | Reserved | | | | | colspan="3" | FPC_SUBCHAN_GAIN 1 | | | | 4 |
| colspan="5" | Reserved | | | | | colspan="3" | FPC_SUBCHAN_GAIN 2 | | | | 5 |
| colspan="5" | Reserved | | | | | colspan="3" | FPC_SUBCHAN_GAIN 3 | | | | 6 |

FIG. 10

| 7 | 6 | 5 | 4 | 3 | 2 | 1 | 0 | Octet |
|---|---|---|---|---|---|---|---|---|
| \multicolumn{8}{|c|}{A3/A7 Element Identifier} | 1 |
| \multicolumn{8}{|c|}{Length} | 2 |
| Rev_Pwr_Cntl_Delay | | | Soft Handoff Leg # | | | PMC Cause Present | Xmit Notify | 3 |
| \multicolumn{8}{|c|}{Length of Traffic Circuit ID} | 4 |
| (MSB) | | | Traffic Circuit ID – first octet | | | | | 5 |
| \multicolumn{8}{|c|}{...} | ... |
| | | Traffic Circuit ID – last octet | | | | | (LSB) | m |
| \multicolumn{8}{|c|}{Length of Channel Element ID} | m+1 |
| (MSB) | | | Channel Element ID – first octet | | | | | m+2 |
| \multicolumn{8}{|c|}{...} | ... |
| | | Channel Element ID – last octet | | | | | (LSB) | n |
| \multicolumn{8}{|c|}{PMC Cause} | n+1 |
| \multicolumn{8}{|c|}{Length of A3 Originating ID 1} | p |
| (MSB) | | | | | | | | p+1 |
| \multicolumn{8}{|c|}{A3 Originating ID 1} | ... |
| | | | | | | | (LSB) | q |
| \multicolumn{8}{|c|}{Length of A3 Originating ID n} | q+1 |
| (MSB) | | | | | | | | q+2 |
| \multicolumn{8}{|c|}{A3 Originating ID n} | ... |
| | | | | | | | (LSB) | r |
| \multicolumn{8}{|c|}{...} | ... |
| \multicolumn{8}{|c|}{Length of A3 Destination ID 1} | s |
| (MSB) | | | | | | | | s+1 |
| \multicolumn{8}{|c|}{A3 Destination ID 1} | ... |
| | | | | | | | (LSB) | t |
| \multicolumn{8}{|c|}{...} | ... |
| \multicolumn{8}{|c|}{Length of A3 Destination ID n} | u |
| (MSB) | | | | | | | | u+1 |
| \multicolumn{8}{|c|}{A3 Destination ID n} | ... |
| | | | | | | | (LSB) | v |

FIG. 11

METHOD OF SUPPORTING REVERSE FCH GATING IN BASE STATION OF A MOBILE COMMUNICATION SYSTEM

PRIORITY

This application claims priority to an application entitled "Method of Supporting Reverse FCH Gating in Base Station of a Mobile Communication System" filed in the Korean Industrial Property Office on Aug. 13, 2001 and assigned Serial No. 2001-48835, the contents of which are hereby incorporated by reference.

BACKGROUND OF THE INVENTION

1. Field of the Invention

The present invention relates generally to a method of increasing the battery lifetime of a mobile station (MS) during a voice call in a mobile communication system, and in particular, to a method of supporting FCH (Fundamental Channel) gating for a voice call in a base station transceiver sub-system (BTS) and a base station controller (BSC).

2. Description of the Related Art

In general, a gating mode is a process of transmitting radio frames at a lower data rate than the previous data rate in the absence of transmission data in a mobile communication system. Reverse channel gating ensures an acceptable performance despite transmission of fewer frames than usual, thereby increasing the battery lifetime of an MS. Particularly, a voice service at a gating mode can maximize the profits of the gating.

An FCH, a pilot channel, and a dedicated control channel in a physical channel operate in a gating mode on the reverse link.

FIG. 1 illustrates a 3G IOS ($3^{rd}$ Generation Interoperability Specifications) reference model of a CDMA mobile communication system having an MSC (Mobile Switching Center), BS (Base Station)s, and a digital air interface between the BSs.

Referring to FIG. 1, an A1 interface carries signaling information between an MSC 20 and a BS 30, and A2 and A5 interfaces (dedicated to circuit data) carry user traffic. An A3 interface carries signaling information and user traffic between an SDU (Frame Selection/Distribution Unit) 34 of the source BS 30 and a target BS 40 in order to implement a soft/softer handoff between the BSs. An A7 interface carries signals between the target BS 40 and the source BS 30, for the soft/softer handoff. A forward link directed from the MSC 20 to the BS 30, a reverse link directed from the BS 30 to the MSC 20, and a link between the BS 30 and the BS 40 are wired communication links. The MSC 20 includes a call control and mobility management block 22 and a switch 24. The MSC 20 is connected to a data network (not shown) via an IWF (Inter-Working Function) 50. A8 and A9 interfaces carry signaling information and user traffic between each BS and a PCF (Packet Control Function) 60. A10 and A11 interfaces carry signaling information and user traffic between the PCF 60 and a PDSN (Packet Data Serving Node) 70.

FIG. 2A is a diagram illustrating a signal flow for implementing a hard handoff of an FCH in a conventional mobile communication system. Referring to FIG. 2A, if the signal strength of an MS is less than a threshold set in a network, the source BS determines to perform a hard handoff to at least one cell of the target BS 40. The source BS 30 transmits a list of corresponding hard handoff cells and a Handoff Required message to the MSC 20, activating a timer T7 in step 2a. In step 2b, the MSC 20 checks a hard handoff bit set in the Handoff Required message. If the hard handoff bit is set to 1 indicating a hard handoff, the MSC 20 transmits a Handoff Request message containing "TIA/EIA-95 Channel Identity", for example, to the target BS 40. In the case of a hard handoff for asynchronous data or a fax service, the Handoff Request message includes a CIC (Circuit Identity Code) extended information element indicating the CIC between the SDU 34 and the IWF 50. Upon receipt of the Handoff Request message from the MSC 20, the target BS 40 connects a call to the MS by assigning radio resources set in the Handoff Request message to the MS and transmits null forward traffic channel frames to the MS in step 2c.

In step 2d, the target BS 40 transmits a Handoff Request Acknowledge message to the MSC 20 and activates a timer T9 until the MS is identified on the assigned radio channel. The MSC 20 prepares for switching a call from the source BS 30 to the target BS 40, transmits a Handoff Command message to the source BS 30, and terminates the timer T7 in step 2e. The source BS 30 transmits one of a General Handoff Direction message, an Extended Handoff Direction message, and a Universal Handoff Direction message to the MS and activates a timer T8 in step 2f. If the MS is allowed to return to the source BS 30, a timer Twaitho (Timer WAIT Hand Off) is also activated.

In step 2g, the MS transmits an MS Ack Order message to the source MS 30 in response to the Handoff Direction message. The source BS 30 terminates the timer T8. If the Handoff Direction message is transmitted by fast repetition, the source BS 30 does not request acknowledgement from the MS. In this case, the timer T8 is not activated in step 2f. In step 2h, the source BS 30 transmits a Handoff Commenced message to the MSC 20 to notify that the MS is ready to switch to a channel of the target BS 40, and a timer T306 is activated until a Clear Command message is received from the MSC 20. If the timer Twaitho was activated, the source BS 30 waits to terminate the timer Twaitho before transmitting the Handoff Commenced message.

In step 2i, the MS transmits a reverse traffic channel frame or a traffic channel preamble to the target BS 40. The MS then transmits a Handoff Completion message to the target BS 40 in step 2j and the target BS 40 wirelessly transmits a BS Ack Order message for the Handoff Completion message to the MS in step 2k. In step 2l, the target BS 40 transmits a Handoff Complete message to the MSC 20 to notify that the hard handoff is successful for the MS, and terminates the timer T9.

In step 2m, the MSC 20 transmits a Clear Command message to the source BS 30 upon receipt of the Handoff Complete message from the target BS 40, and the source BS 30 terminates the timer T306. The MSC 20 activates a timer T315. In the case of a hard handoff for asynchronous data or a fax service, the MSC 20 releases all resources including an A5 connection from the source BS 30 by the Clear Command message. In step 2n, the source BS 30 transmits a Clear Complete message to the MSC 20 to notify that the release is successfully completed and the MSC 20 terminates the timer T315.

FIG. 2B is a diagram illustrating a signal flow for implementing a soft handoff of an FCH in the conventional mobile communication system. Referring to FIG. 2B, at a soft handoff the source BS 30 selects the target BS 40 that can offer radio resources to the MS and at least one of the cells of the target BS 40 in step 3a. The source BS 30 transmits an A7-Handoff Request message to the target BS 40 to request assignment of radio resources from the soft handoff cells and activates a timer Thoreq (Timer Hand Off REQuest). In step 3*b*, the target BS 40 determines soft handoff cells which can offer radio sources, transmits an A3-Connect message to the source BS 30 to establish new radio links for transmitting forward/reverse user data frames, or add a connection to an existing connection, and activates a timer Tconn3 (Timer CONNect 3). The source BS 30 transmits an A3-Connect Ack message to the target BS 40 in response for the A3-Connect message in step 3*c*. At the same time, the target BS 40 terminates the timer Tconn3. In step 3*d*, the source BS 30 transmits forward frames to the target BS 40. The target BS 40 transmits reverse idle frames to the source BS 30 for tuning in step 3*e*.

In step 3*f*, the target BS 40 transmits forward frames to the MS on its assigned radio channel. The target BS 40 transmits an A7-Handoff Request Ack message to the source BS 30, indicating cells to which radio resources have been successfully assigned and the source BS 30 terminates the timer Thoreq in step 3*g*. After the source BS 30 is notified of successful reception of its forward frames and commencement of wireless transmission in the target BS 40, if the SDU 34 of the source BS 30 is well tuned to the target BS 40 and a traffic connection is established between the SDU 34 and the target BS 40, the target BS 40 transmits an A3-Traffic Channel Status message to the source BS 30 in step 3*h*.

In step 3*i*, the source BS 30 transmits a Handoff Direction message to the MS to enable the MS to add the new cells to its active set. The MS transmits an MS Ack Order message to the source BS 30 in response to the Handoff Direction message in step 3*j*. In step 3*k*, the MS transmits a Handoff Completion message to the source BS 30, notifying that the Handoff Direction message has been successfully processed. The source BS 30 transmits a BS Ack Order message to the MS in response for the Handoff Completion message in step 3*l*. In step 3*m*, the source BS 30 can selectively transmit a Handoff Performed message to the MSC 20, indicating a soft handoff success.

The above handoff (soft handoff and hard handoff) procedures have the following problems on the side of a BS.

(1) There is no way of notifying a neighbor BS of the current reverse link gating mode in progress at a hard handoff of an FCH for a voice call. Therefore, the gating mode is not available to a new FCH assigned by a target BS after the hard handoff.

(2) There is no way of notifying a neighbor BS of the current reverse link gating mode in progress at a soft handoff of an FCH for a voice call. Therefore, the gating mode is not available to a new FCH assigned by a target BS after the soft handoff. An MS at the soft handoff receives FCH frames of source and target BSs from the BSC of the source BS. In comparison, it turns out that the FCH frame from the target BS is inferior in quality to the FCH frame from the source BS. Consequently, signal quality is deteriorated after the MS moves to the target BS and thus a call is disconnected.

(3) In the case where the MS is assigned an FCH by call origination or call termination, it can set a reverse FCH gating mode while the FCH is assigned. However, such an operation is not defined yet between a BTS (Base station Transceiver Sub-system) and a BSC. That is, the reverse FCH gating is not supported at present.

SUMMARY OF THE INVENTION

It is, therefore, an object of the present invention to provide a method of notifying a target BSC that an MS is in a reverse FCH gating mode, via an MSC by a source BSC at a hard handoff in a mobile communication system.

It is another object of the present invention to provide a method of notifying a source BSC whether a target BSC supports reverse FCH gating, via an MSC by the target BSC at a hard handoff in a mobile communication system.

It is a further object of the present invention to provide a method of directly notifying a target BSC that an MS receiving a service is in a reverse FCH gating mode, by a source BSC at a soft handoff in a mobile communication system.

It is still another object of the present invention to provide a method of directly notifying a source BSC whether a target BSC supports reverse FCH gating, by the target BSC at a soft handoff in a mobile communication system.

It is also still another object of the present invention to provide a method of supporting reverse FCH gating while an FCH is assigned to an MS in a mobile communication system.

It is yet another object of the present invention to provide a method of notifying a target BS whether an MS is in a reverse gating mode, by a source BS at a handoff in a mobile communication system.

To achieve the above and other objects, at a handoff from a first BS to a second BS, the first base station transmits to the second base station information about whether an MS transmits data on the channel to the first BS in a reverse gating mode. The second BS determines whether to support the reverse gating mode after the handoff. Then the second BS transmits to the first BS a handoff request acknowledgement message including information whether the second BS supports the reverse gating mode after the handoff.

BRIEF DESCRIPTION OF THE DRAWINGS

The above and other objects, features and advantages of the present invention will become more apparent from the following detailed description when taken in conjunction with the accompanying drawings in which:

FIG. 3 illustrates an information element IS-2000 Channel Identity including bits indicating whether the current assigned FCHs are set to a reverse gating mode at a hard handoff of an FCH according to an embodiment of the present invention;

FIG. 4 illustrates an information element Physical Channel Info including a bit indicating that an FCH assigned by a source BS is set to a reverse gating mode at a soft handoff of the FCH according to the embodiment of the present invention;

FIG. 5 illustrates an information element Hard Handoff Parameters including bits indicating a reverse power control delay requested by a target BS at the hard handoff of the FCH according to the embodiment of the present invention;

FIGS. 6A and 6B illustrate an information element A3 Connect Information including bits indicating a reverse power control delay requested by the target BS at the soft handoff of the FCH according to the embodiment of the present invention;

FIG. 10 illustrates an information element IS-2000 Power Control Info including bits indicating a reverse power control delay at the soft handoff of the FCH according to the embodiment of the present invention;

FIG. 11 illustrates an information element A3-Connect Ack Information including bits indicating a reverse power control delay requested by the source BS at the soft handoff of the FCH according to the embodiment of the present invention.

DETAILED DESCRIPTION OF THE PREFERRED EMBODIMENT

Figure 1:
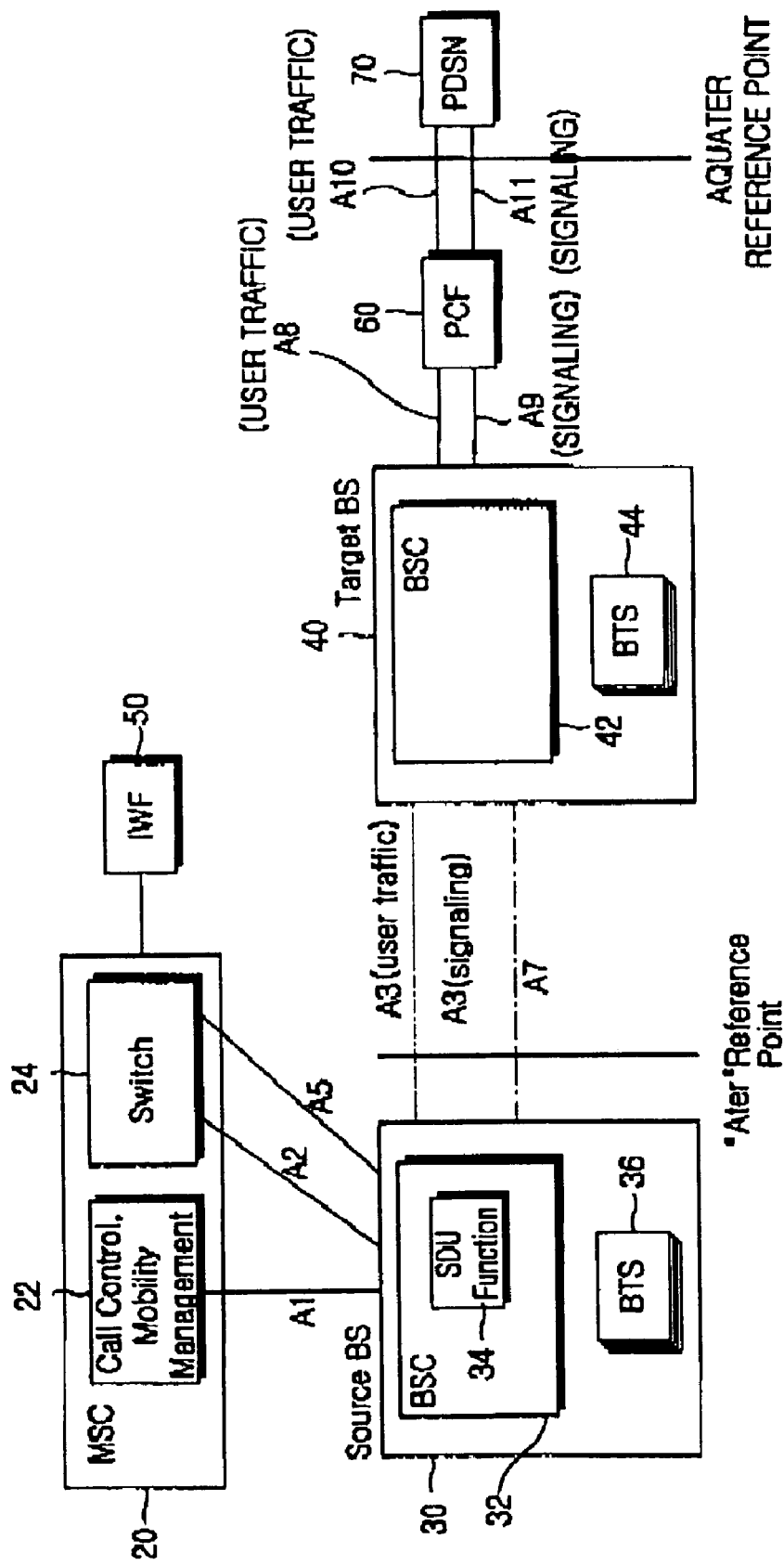
FIG. 1 illustrates a 3G IOS reference model of an MSC, a BS, and a digital air interface between BSs in a typical mobile communication system.

A preferred embodiment of the present invention will be described herein below with reference to the accompanying drawings. In the following description, well-known functions or constructions are not described in detail since they would obscure the invention in unnecessary detail.

First, signal messages according to the present invention will be described, followed by a description of the uses of the signal messages.

FIG. 3 illustrates an information element IS-2000 Channel Identity including bits indicating whether the current assigned FCHs are set to a reverse gating mode at a hard handoff according to an embodiment of the present invention. When an FCH is set to a reverse gating mode, it implies that an MS transmits reverse gated FCH frames to a BS. The above information element is transmitted in a signal message used for a hard handoff, for example, Handoff Required, Handoff Request, Handoff Request Ack, or Handoff Command.

Referring to FIG. 3, IS-2000 Channel Identity includes 1-bit fields indicating whether the current FCHs are in a reverse gating mode. The fields are the $7^{th}$ bit (Rev_FCH_Gating 1) of a $5^{th}$ octet and the $7^{th}$ bit (Rev_FCH_Gating n) of a (k+1) octet. The fields indicate whether reverse FCH gating is being provided or is available. If a corresponding BS is providing or can provide reverse FCH gating, the field is set to 1, and otherwise, it is set to 0. IS-2000 Channel Identity is used for the source BS 30 to notify the target BS 40 that the current assigned FCH is in a reverse gating mode, or for the target BS 40 to notify the source BS whether the target BS 40 can provide reverse FCH gating, at a hard handoff. Therefore, the use of the fields is system-dependent.

FIG. 4 illustrates an information element Physical Channel Info including a bit indicating that an FCH assigned by a source BS is set to a reverse gating mode at a soft handoff of the FCH according to the embodiment of the present invention. The information element is transmitted in a signal message used for a soft handoff, for example, A7-Handoff Request. Physical Channel Info includes a 1-bit field indicating that the current FCH is in a reverse gating mode. The field occupies the $6^{th}$ bit (Rev_FCH_Gating) of a $3^{rd}$ octet in FIG. 4. Rev_FCH_Gating indicates whether reverse FCH gating is being provided or is available. If a corresponding BS is providing or can provide reverse FCH gating, the field is set to 1, and otherwise, it is set to 0. Physical Channel Info is used for the source BS 30 to notify the target BS 40 that the current assigned FCH is in a reverse gating mode at a soft handoff.

FIG. 5 illustrates an information element Hard Handoff Parameters including bits indicating a reverse power control delay requested by the target BS at the hard handoff of the FCH according to the embodiment of the present invention. Hard Handoff Parameters are transmitted in a signal message used for a hard handoff, for example, Handoff Request Ack or Handoff Command.

Referring to FIG. 5, Hard Handoff Parameters contains one bit indicating whether the target BS can provide reverse FCH gating and two bits indicating a reverse power control delay. The reverse power control delay is used to control the transmission of the MS a predetermined time after a hard handoff. The fields are the $7^{th}$ bit (Rev_FCH_Gating_Mode) and the $5^{th}$ and $6^{th}$ bits (Rev_Pwr_Cntl_Delay) of a $4^{th}$ octet. Rev_FCH_Gating_Mode is used in the same manner as Rev_FCH_Gating described referring to FIG. 4, and the Rev_Pwr_Cntl_Delay is set to one of 00, 01, 10 and 11. If Rev_Pwr_Cntl_Delay is 00, it implies that the target BS supports reverse FCH gating but cannot provide the reverse FCH gating at present. If Rev_Pwr_Cntl_Delay is one of 01, 10 and 11, it indicates a reverse power control delay for the MS after a hard handoff. How to set Rev_Pwr_Cntl_Delay will be described later with reference to FIG. 7.

FIGS. 6A and 6B illustrate an information element A3 Connect Information including bits indicating a reverse power control delay requested by the target BS at the soft handoff of the FCH according to the embodiment of the present invention. The information element is transmitted in a signal message used for a soft handoff, for example, A3-Connect.

Referring to FIGS. 6A and 6B, A3 Connect Information contains one bit indicating whether the target BS can provide reverse FCH gating at a soft handoff and two bits indicating a reverse power control delay. Fields added according to the present invention are the $6^{th}$ bit (Rev_Gating_Mode) and the $4^{th}$ and $5^{th}$ bits (Rev_Pwr_Cntl_Delay) of a (j+3) octet, and the $6^{th}$ bit (Rev_Gating_Mode) and the $4^{th}$ and $5^{th}$ bits (Rev_Pwr_Cntl_Delay) of a (1+3) octet. Rev_Gating_Mode is used in the same manner as Rev_FCH_Gating and Rev_FCH_Gating_Mode described referring to FIGS. 4 and 5. Rev_Pwr_Cntl_Delay is set to one of 00, 01, 10 and 11. If Rev_Pwr_Cntl_Delay is 00, it implies that the target BS supports reverse FCH gating but cannot provide the reverse FCH gating at present. If Rev_Pwr_Cntl_Delay is one of 01, 10 and 11, it indicates a reverse power control delay for the MS after a soft handoff. How to set Rev_Pwr_Cntl_Delay will be described later with reference to FIG. 9.

Figure 7:
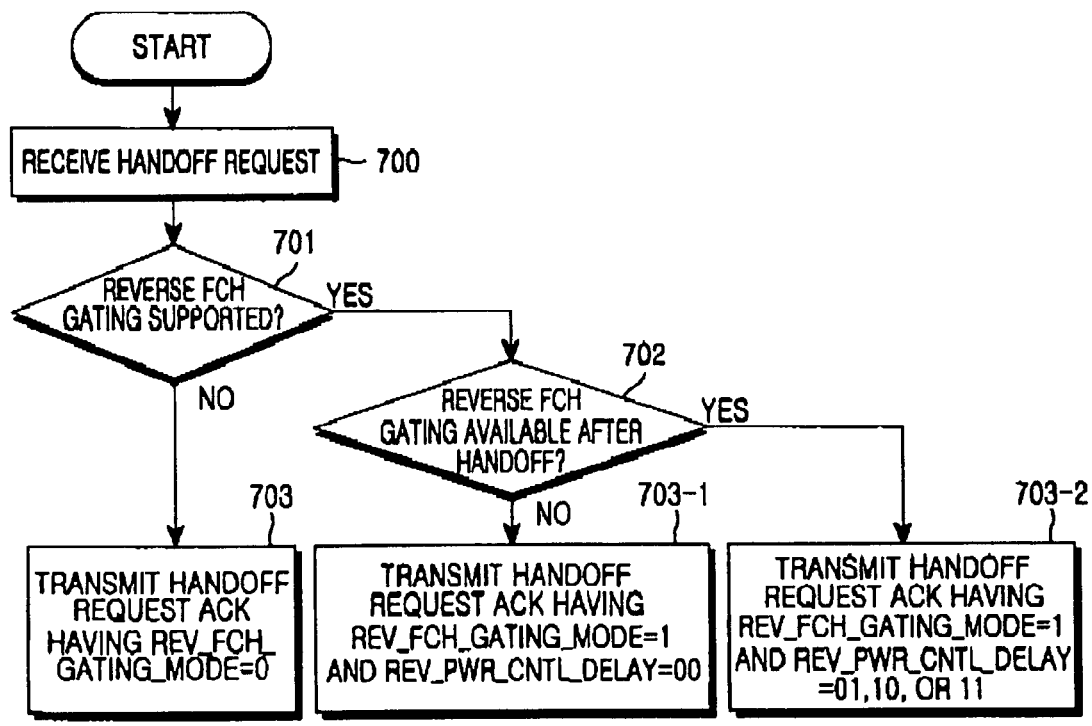
FIG. 7 is a flowchart illustrating a procedure in the target BS for setting an FCH reverse gating mode and transmitting a signal message to the source BS at the hard handoff of the FCH according to the embodiment of the present invention.

FIG. 7 is a flowchart illustrating a procedure for setting an FCH reverse gating mode and transmitting a signal message to the source BS at the hard handoff of the FCH in the target BS according to the embodiment of the present invention.

Referring to FIG. 7, the target BS 40 receives a Handoff Request message received from the MSC 20 in step 700. As described before, the Handoff Request message contains the information element IS-2000 Channel Identity illustrated in FIG. 3. If the target BS 40 determines that a reverse FCH of the MS is in a gating mode from the Handoff Request message, it checks whether a cell that is to assign an FCH can provide reverse FCH gating (Rev_FCH_Gating_Mode=0 or 1) in step 701. If the cell supports the reverse FCH gating, the target BS 40 proceeds to step 702, and otherwise, it goes to step 703.

In step 702, the target BS 40 determines whether to provide the reverse FCH gating after the hard handoff. If the hard handoff cell supports the reverse FCH gating but is to terminate it for such a reason that the MS is remote from the target BS 40 or an FER (Frame Error Rate) is low, the target BS 40 transmits a Handoff Request Ack including Rev_FCH_Gating_Mode set to 1 and Rev_Pwr_Cntl_Delay set to 00 to the MSC 20 in step 703-1. If the target BS 40 is to provide th reverse FCH gating after the hard handoff, it transmits a Handoff Request Ack including Rev_FCH_Gating_Mode set to 1 and Rev_Pwr_Cntl_Delay set to one of 01, 10 and 11 to the MSC 20 in step 703-2. For example, the target BS 40 sets Rev_Pwr_Cntl_Delay to a predetermined one of 01, 10 and 11, or to 11, 10 and 01 in this order as the MS is more remote from the target BS 40 and has a lower FER.

If the hard handoff cell cannot support the reverse FCH gating as determined in step 701, the target BS 40 transmits a Handoff Request Ack including Rev_FCH_Gating_Mode set to 0 to the MSC 20 in step 703.

Figure 8:
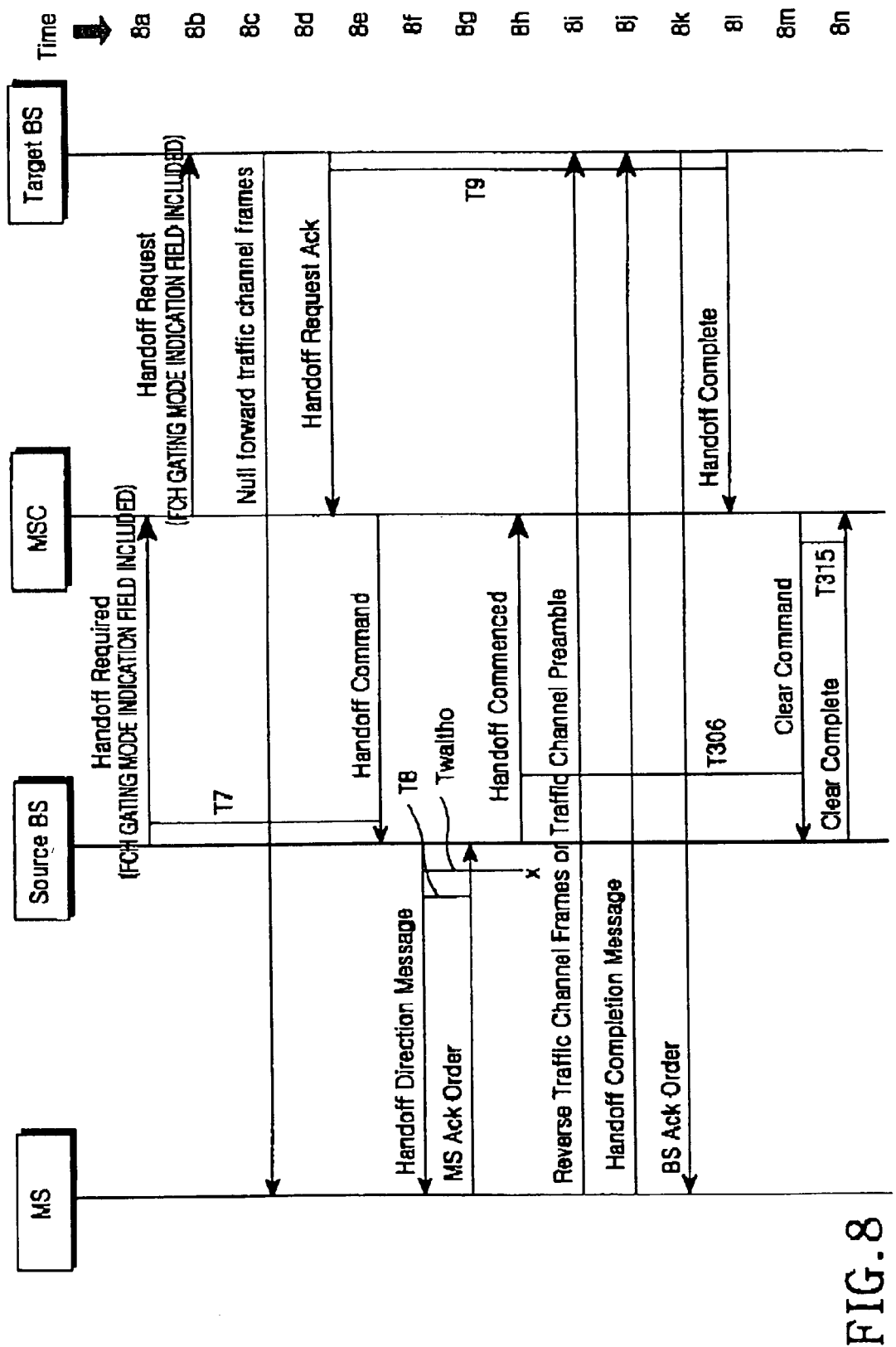
FIG. 8 is a diagram illustrating a signal flow for supporting reverse FCH gating between the target BS and the source BS at the hard handoff of the FCH according to the embodiment of the present invention.

FIG. 8 is a diagram illustrating a signal flow for supporting reverse FCH gating between the target BS and the source BS at a hard handoff of the FCH according to the embodiment of the present invention.

Referring to FIG. 8, the source BS 30 transmits to the MSC 20 a Handoff Required message including IS-2000 Channel Identity indicating whether the target BS supports reverse FCH gating in step 8*a*. The MSC 20 checks a hard handoff bit set in the Handoff Required message in step 8*b*. It is assumed that a hard handoff bit set to 1 indicates a hard handoff. When the hard handoff bit is 1, the MSC 20 transmits to the target BS 40 a Handoff Request message including IS-2000 Channel Identity. In step 8*c*, the target BS performs the procedure illustrated in FIG. 7 to support the reverse FCH gating according to the Handoff Request message and transmits null forward traffic channels frames to the MS.

The target BS 40 transmits to the MSC 20 a Handoff Request Ack message including IS-2000 Channel Identity of FIG. 3 and Hard Handoff Parameters in step 8*d*. The MSC 20 prepares for switching a call from the source BS 30 to the target BS 40 and transmits to the source BS 30 a Handoff Command message including IS-2000 Channel Identity and Hard Handoff Parameters received from the target BS 40 in step 8*e*.

Figure 2A:
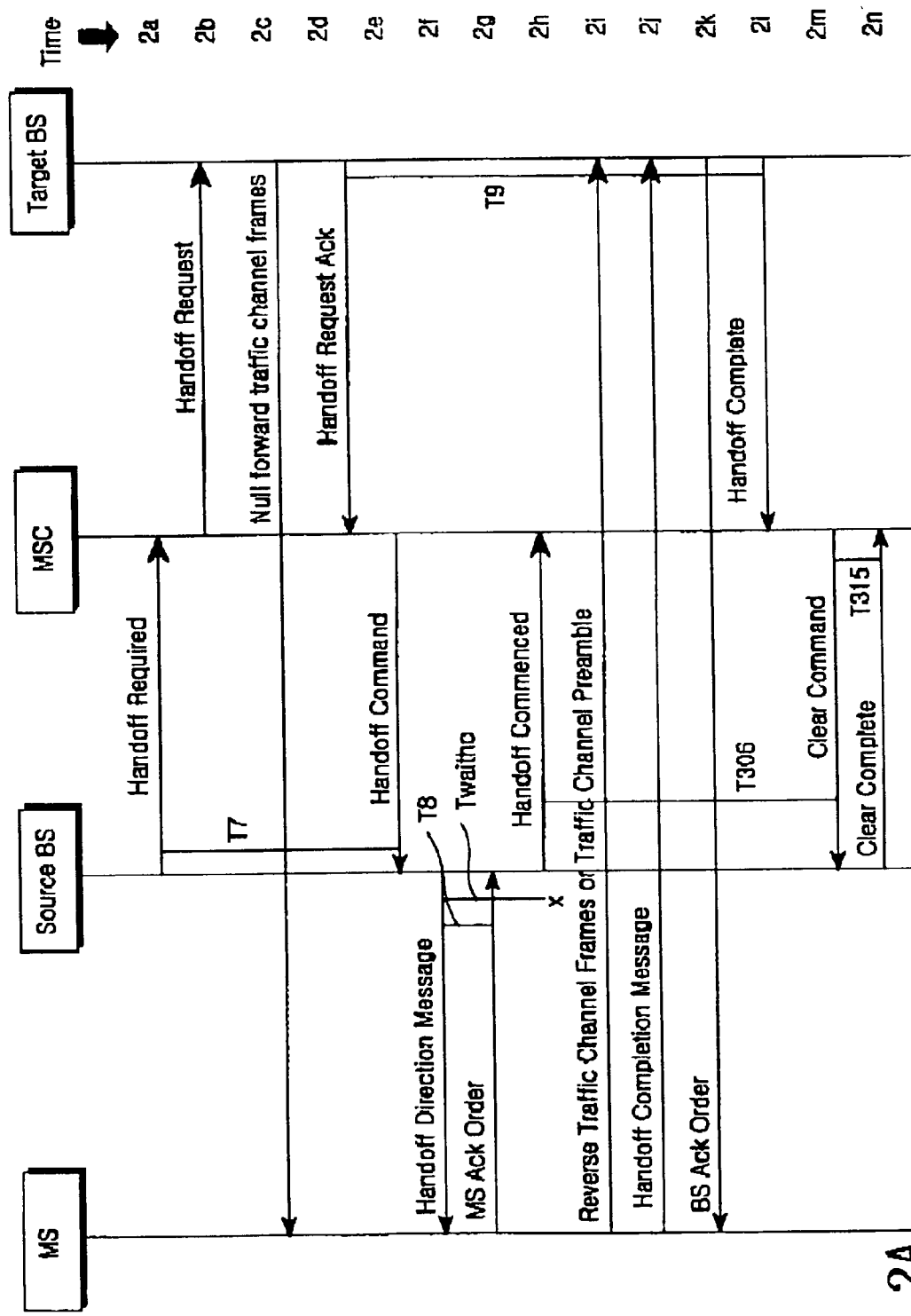
FIG. 2A is a diagram illustrating a signal flow for implementing a hard handoff of an FCH in a conventional mobile communication system.
Figure 2B:
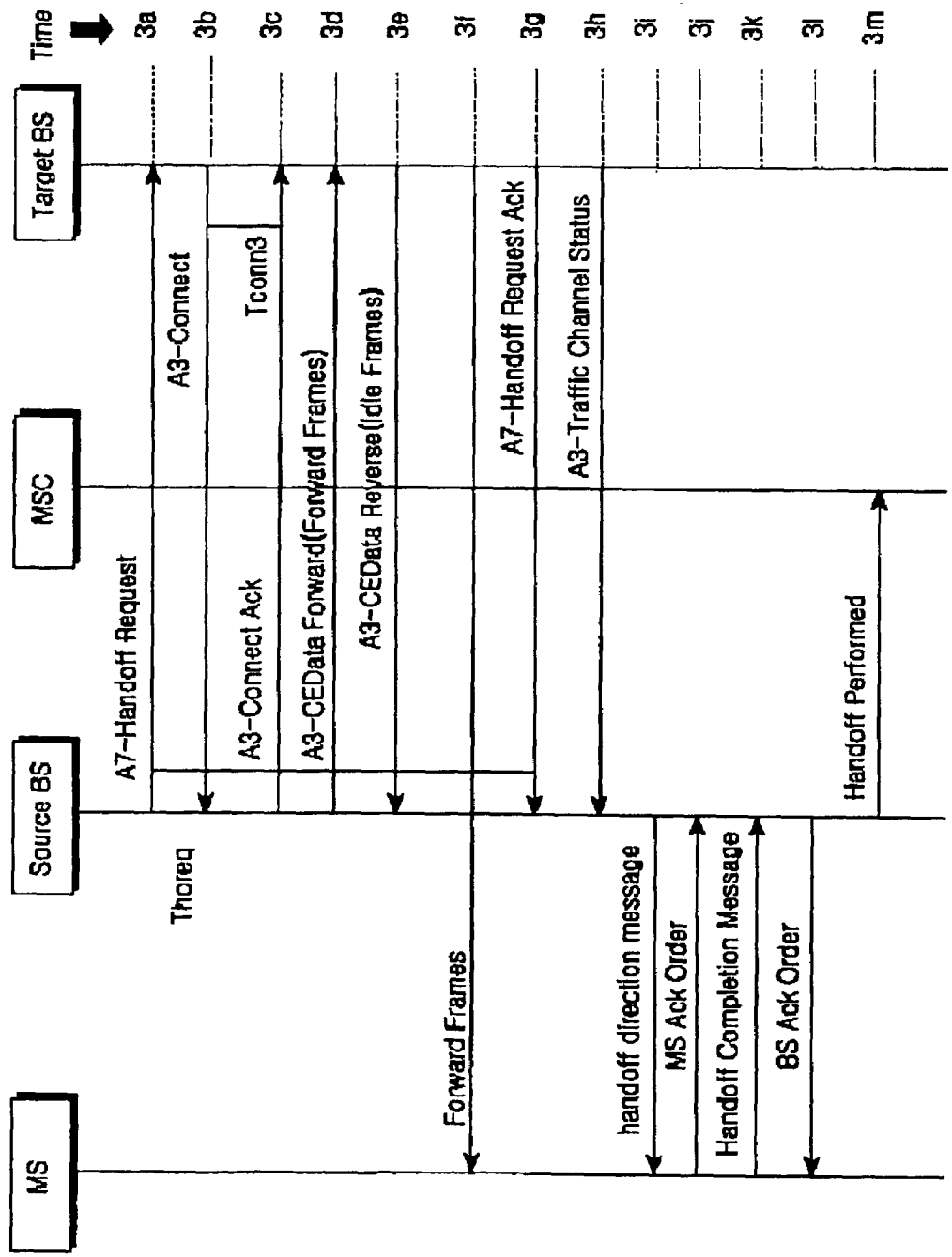
FIG. 2B is a diagram illustrating a signal flow for implementing a soft handoff of the FCH in the conventional mobile communication system.

In step 8*f*, the source BS 30 analyzes the Handoff Command message by reading a value indicating whether the target BS 40 supports the reverse FCH gating and a value indicating a reverse power control delay from IS-2000 Channel Identity and Hard Handoff Parameters, and transmits to the MS a General Handoff Direction message, an Extended Handoff Direction message, or a Universal Handoff Direction message that includes the read values. The subsequent steps 8*g* to 8*n* are the same to steps 2*g* to 2*n* illustrated in FIG. 2A and thus their description is not provided here.

Figure 9:
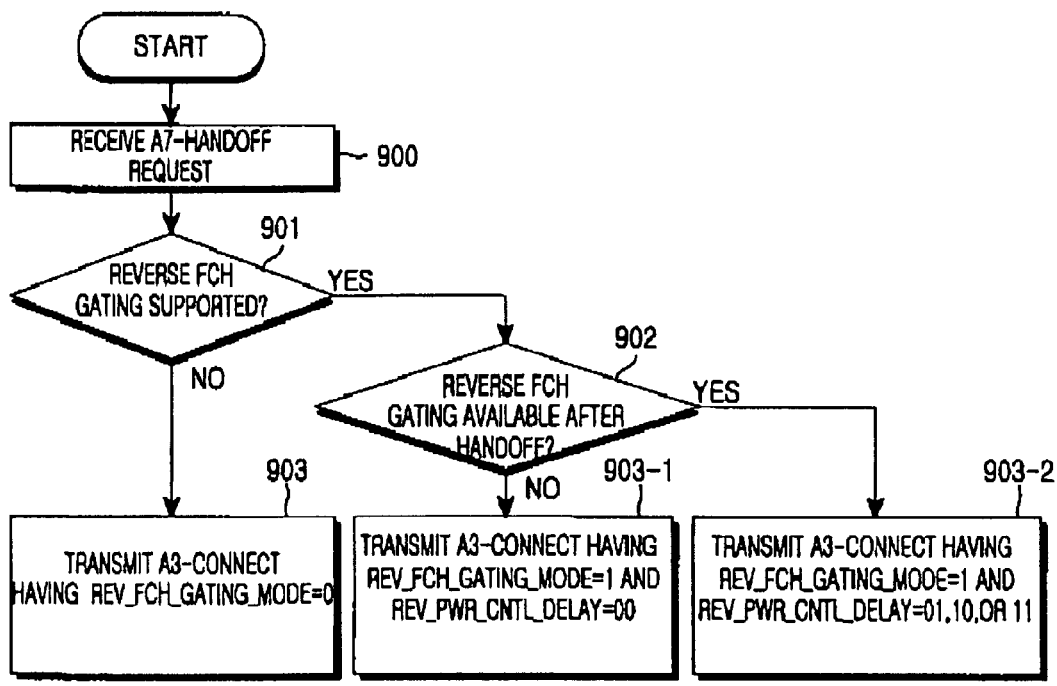
FIG. 9 is a flowchart illustrating a procedure for setting an FCH reverse gating mode and transmitting a signal message to the source BS at the soft handoff of the FCH in the target BS according to the embodiment of the present invention.

FIG. 9 is a flowchart illustrating a procedure for setting an FCH reverse gating mode and transmitting a signal message to the source BS at the soft handoff of the FCH in the target BS according to the embodiment of the present invention.

Referring to FIG. 9, the target BS 40 receives an A7-Handoff Request message received from the source BS 30 in step 900. The target BS 40 determines that the MS is in a reverse FCH gating mode and reads the current reverse power control delay. Then the target BS 40 determines whether a cell that will assign an additional FCH to the MS supports (Rev_Gating_Mode=0 or 1) in step 901. The determination is made by the BSC of the target BS 40. If the cell supports the reverse FCH gating, the target BS 40 proceeds to step 902, and otherwise, it goes to step 903.

In step 902, the target BSC transmits to a target BTS the reverse power control delay received from the BSC of the source BS 30, and the target BTS determines whether to provide the reverse FCH gating after the soft handoff (Rev_Pwe_Cntl_Delay=0 or not). If the target BS supports but is to terminate the reverse FCH gating for such a reason that the MS is remote from the target BS 40 or an FER is low, the target BS 40 transmits to the source BS 30 an A3-Connect message including Rev_Gating_Mode set to 1 and Rev_Pwr_Cntl_Delay set to 00 in step 903-1. If the target BS 40 is to provide the reverse FCH gating after the soft handoff, it transmits to the source BS 30 an A3-Connect message including Rev_Gating_Mode set to 1 and Rev_Pwr_Cntl_Delay set to one of 01, 10 and 11 in step 903-2. For example, the target BS 40 sets Rev_Pwr_Cntl_Delay to a predetermined one of 01, 10 and 11, or to 11, 10 and 01 in this order as the MS is more remote from the target BS 40 and has a lower FER.

If the soft handoff cell cannot support the reverse FCH gating as determined in step 901, the target BS 40 transmits to the source BS 30 an A3-Connect message including Rev_Gating_Mode set to 0 in step 903.

FIG. 10 illustrates an information element IS-2000 Power Control Info including bits indicating a reverse power control delay that the source BS requests to the target BS at the soft handoff of the FCH according to the embodiment of the present invention. The information element is transmitted in a signal message used for a soft handoff, for example, A7-Handoff Request.

Referring to FIG. 10, IS-2000 Power Control Info includes one bit indicating whether the MS is in a reverse FCH gating mode and two bits indicating a reverse power control delay at a soft handoff. Fields added according to the present invention are the $5^{th}$ bit (Rev_FCH_Gating_Mode) and the $3^{rd}$ and $4^{th}$ bits (Rev_Pwr_Cntl_Delay) of a $3^{rd}$ octet. The functions of Rev_FCH_Gating_Mode and Rev_Pwr_Cntl_Delay were described before.

FIG. 11 illustrates an information element A-3 Connect Ack Information including bits indicating a reverse power control delay that the source BS requests to the target BS at the soft handoff of the FCH according to the embodiment of the present invention. This information element is transmitted in a signal message used for a soft handoff, for example, A7-Handoff Request.

Referring to FIG. 11, A3-Connect Ack Information includes two bits indicating a reverse power control delay when the source BS provides reverse FCH gating at a soft handoff. A field added according to the present invention occupies the $6^{th}$ and $7^{th}$ bits (Rev_Pwr_Cntl Delay) of a $3^{rd}$ octet. Rev_Pwr_Cntl_Delay is set to 00, 01, 10 or 11. If Rev_Pwr_Cntl_Delay is implies that the reverse FCH gating is supported but cannot be provided, at present. The other values indicate reverse power control delays to be used after the soft handoff. As stated before, the reverse power control delay can be set according to an FER and the distance between the MS and the target BS.

Figure 12:
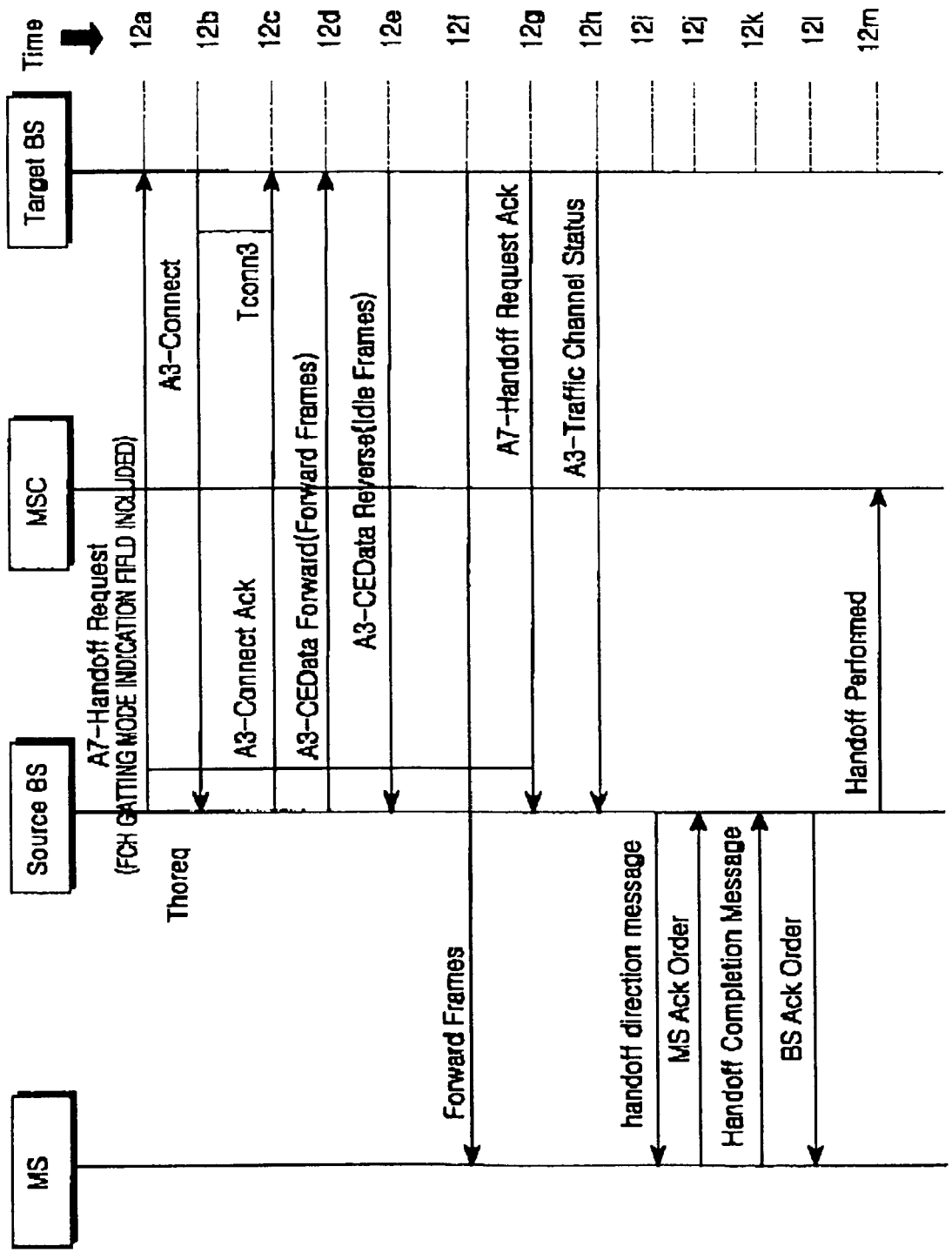
FIG. 12 is a diagram illustrating a signal flow for supporting reverse FCH gating between the target BS and the source BS at the soft handoff of the FCH according to the embodiment of the present invention.

FIG. 12 is a diagram illustrating a signal flow for supporting reverse FCH gating between the target BS and the source BS at the soft handoff of the FCH according to the embodiment of the present invention.

Referring to FIG. 12, the source BS 30 determines the target BS 40 that can provide radio resources to the MS at a soft handoff and at least one cell of the target BS 40 in step 12*a*. The source BS 30 transmits to the target BS 40 an A7-Handoff Request message to request assignment of radio resources of the determined soft handoff cells to the target BS 40, and activates a timer Thoreq. At the same time, the source BS notifies the target BS 40 of a reverse power control delay set for the current reverse FCH gating of the MS using Physical Channel Info of FIG. 4 or IS-2000 Power Control Info of FIG. 10 in the A7-Handoff Request message.

In step 12*b*, the target BS 40 determines soft handoff cells which can offer radio sources, transmits an A3-Connect message to the source BS 30 to establish new radio links for transmitting forward/reverse user data frames, or add a connection to an existing connection, and activates a timer Tconn3. The target BS 40 writes A3-Connect Information indicating whether the soft handoff cells can provide reverse FCH, gating as a result of the procedure illustrated in FIG. 9 in the A3-Connect message. The source BS 30 selects cells supporting the reverse FCH gating in the A3-Connect message, and determines the same reverse power control delay value for the cells or a reverse power control delay indicating a non-reverse FCH gating mode for all of the cells after the soft handoff.

In step 12*c*, the source BS 30 transmits an A3-Connect Ack message to the target BS 40 in response for the A3-Connect message. At the same time, the target BS 40 terminates the timer Tconn3. The source BS 30 transmits to the target BS 40 an A3-Connect Ack message including A3-Connect Ack information indicating the determined reverse power control delay. In step 12*d*, the source BS 30 transmits forward frames to the target BS 40. The target BS 40 transmits reverse idle frames for tuning to the source BS upon receipt of the first forward frame in step 12*e*. After tuning is completed, the target BS 40 transmits forward frames to the MS on its assigned radio channel in step 12*f*. The target BS 40 transmits an A7-Handoff Request Ack message to the source BS 30, indicating cells to which radio resources have been successfully assigned and the source BS 30 terminates the timer Thoreq in step 12*g*.

After the source BS 30 is notified of successful reception of its forward frames and commencement of wireless transmission in the target BS 40, if the SDU 34 of the source BS 30 is well tuned to the target BS 40 and a traffic connection is established between the SDU 34 and the target BS 40, the target BS 40 transmits an A3-Traffic Channel Status message to the source BS 30 in step 12*h*.

In step 12*i*, the source BS 30 transmits a Handoff Direction message to the MS to order the MS to add the new cells to its active set. Here, Rev_FCH_Gating_Mode and Rev_Pwr_Cntl_Delay are set in the Handoff Direction message.

In step 12*j*, the MS transmits an MS Ack Order message to the source BS 30 in response to the Handoff Direction message. In step 12*k*, the MS transmits a Handoff Completion message to the source BS 30, notifying that the Handoff Direction message has been successfully processed. The source BS 30 transmits a BS Ack Order message to the MS in response for the Handoff Completion message in step 12*l*. In step 12*m*, the source BS 30 can selectively transmit a Handoff Performed message to the MSC 20, indicating a soft handoff success.

In the present invention, an indicator bit indicating whether reverse FCH gating is provided or not is added to existing information elements, IS-2000 Channel Identity and Physical Channel Info as illustrated in FIGS. 3 and 4. IS-2000 Channel Identity is transmitted in a signal message used for a hard handoff (e.g., Handoff Required, Handoff Request, Handoff Request Ack, and Handoff Command), and Physical Channel Info is transmitted in a signal message used for a soft handoff (e.g., A7-Handoff Request). The information element, Hard Handoff Parameters illustrated in FIG. 5 is transmitted in a signal used for a hard handoff (e.g., Handoff Request Ack and Handoff Command). The information element illustrated in FIG. 6, A3-Connect Information is transmitted in a signal used for a soft handoff (e.g., A3-Connect).

As described above, a target BSC is notified whether an MS is in a reverse FCH gating mode at a handoff in the present invention. The target BSC can notify a source BSC whether the target BSC can provide the reverse FCH gating, and the source BSC can notify the MS whether the reverse FCH gating is provided at a handoff, considering the status of the target BSC. Furthermore, the MS is notified when a reverse power control can be performed after the handoff. That is, procedures for supporting the reverse FCH gating are defined, thereby solving the conventional problem of discontinuation of the gating mode due to a handoff and the resulting call disconnection.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of supporting gated transmission of a fundamental channel assigned to a mobile station for communication with a first base station during soft handoff from the first base station to a second base station adjacent to the first base station in a mobile communication system, comprising the steps of:

transmitting by the first base station to the second base station handoff request message including information whether the MS is transmitting data on the channel to the first base station in a reverse gating mode;

determining by the second base station whether to support the reverse gating mode in data transmission on the channel from the MS to the second base station after the handoff in response to the handoff request message;

transmitting by the second base station to the first base station a handoff request acknowledgement message including information whether the second base station provides the reverse gating mode and a reverse power control delay value indicating a transmission power control time point after the handoff; and transmitting by the first base station to the mobile station a handoff direction message including the information whether the second base station provides the reverse gating mode and the reverse power control delay value in response to the handoff request acknowledgement message.

2. The method of claim 1, wherein the reverse power control delay value is determined according to a frame error rate and the distance between the mobile station and the second base station.

3. The method of claim 1, wherein the reverse power control delay value is a predetermined value.

4. A method of supporting gated transmission of a fundamental channel assigned to a mobile station for communication with a first base station at a hard handoff from the first base station to a second base station adjacent to the first base station in a mobile communication system having the mobile station, the first and second base stations, and a mobile switching center, comprising the steps of:

transmitting by the first base station to the second base station via the mobile switching center handoff request message including information whether the MS is transmitting data on the channel to the first base station in a reverse gating mode;

determining by the second base station whether to support the reverse gating mode in data transmission on the channel from the MS to the second base station after the handoff in response to the handoff request message;

transmitting by the second base station to the first base station via the mobile switching center a handoff request acknowledgement message including information whether the second base station provides the reverse gating mode and a reverse power control delay value indicating a transmission power control time point after the handoff; and transmitting by the first base station to the mobile station a handoff direction message including the information whether the second base station provides the reverse gating mode and the reverse power control delay value in response to the handoff request acknowledgement message.

5. The method of claim 4, wherein the reverse power control delay value is determined according to a frame error rate and the distance between the mobile station and the second base station.

6. The method of claim 4, wherein the reverse power control delay value is a predetermined value.

7. The method of claim 4, wherein the information is an indicator bit indicating whether to support the reverse gating mode is added to existing information elements.

* * * * *